March 28, 1967   N. F. BEASLEY   3,311,125
FLOW-RESPONSIVE VALVE FOR SUPPLYING PRESSURE SIGNAL
Filed July 20, 1964

INVENTOR.
NOEL F. BEASLEY
BY Fulwider, Patton, Rieber,
Lee, and Utecht
ATTORNEYS 3,311,125
FLOW-RESPONSIVE VALVE FOR SUPPLYING
PRESSURE SIGNAL
Noel F. Beasley, Santa Monica, Calif., assignor to Bennett Respiration Products, Inc., Santa Monica, Calif., a corporation of California
Filed July 20, 1964, Ser. No. 383,610
10 Claims. (Cl. 137—117)

This invention relates to valves and more particularly to an improved valve of the type which is responsive to a primary flow of pressurized fluid for supplying a pressure signal or secondary flow.

Valves of this general type find useful application in a wide variety of systems and environments. By way of example, such valves may be used to advantage in respiration systems. In this application, primary flow may take place from a source of pressurized gas to the patient. When the primary flow to the patient exceeds a predetermined threshold level, as would be the case during the inspiration phase of operation, a secondary flow is furnished to operate a nebulizer or other element of the system.

The operational characteristics of valves of this type heretofore available have been somewhat less than satisfactory. Specifically, the threshold flow at which the valve operates to supply a pressure signal (or secondary flow) and the primary flow capacity of the valve have been dependent upon one another. Accordingly, if the primary flow capacity was made sufficiently high to satisfy the requirements of the system, then the valve could not be made to supply a pressure signal at a sufficiently low threshold flow. On the other hand, if the valve was constructed to supply a signal at a sufficiently low threshold flow to meet operational requirements, then the maximum primary flow capacity of the valve would be unduly limited.

Accordingly, it is a primary object of this invention to provide an improved valve for supplying a pressure signal when the primary flow rate exceeds a predetermined threshold level, the valve being characterized in that the threshold flow is effectively independent of the primary flow capacity of the valve.

Another object of the invention is to provide a valve of the type described in which the threshold level of primary flow at which the pressure signal is supplied may be conveniently adjusted.

A further object is to provide a valve of the type described which is positive acting in its operation of opening to supply an output pressure signal.

It is a still further object to provide a valve of the type described capable of accomplishing all of the foregoing objects, yet which is extremely simple in construction and economical to manufacture.

Figure 1:
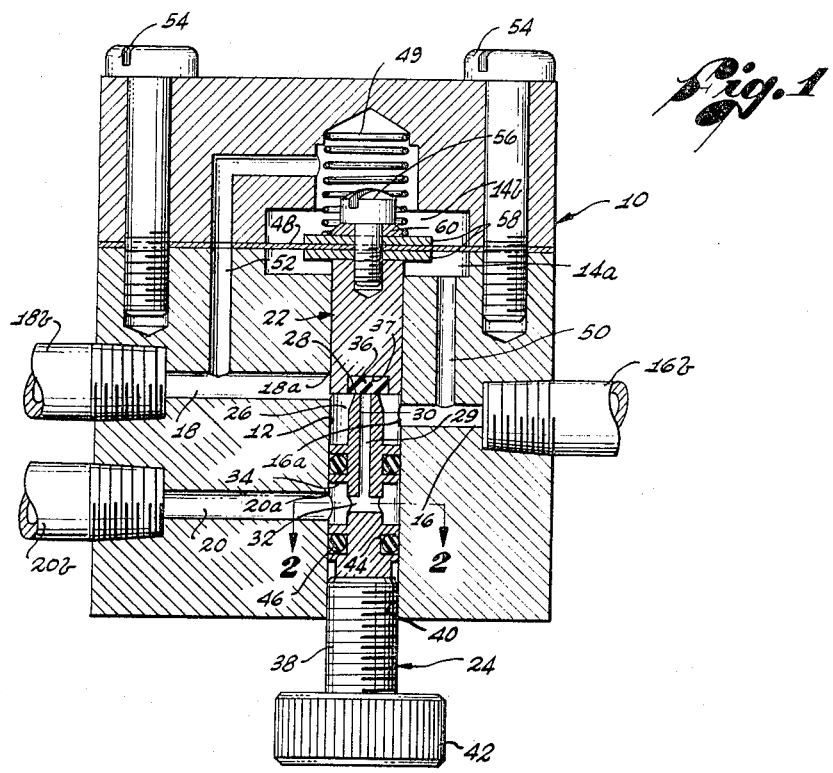
Figure 2:
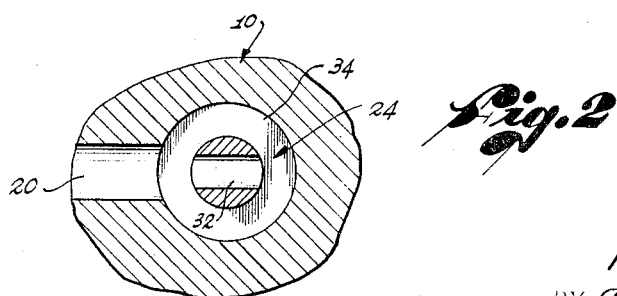

These and other objects, features, and advantages of the invention will be better understood by referring to the following detailed description taken in conjunction with the accompanying drawing in which:

FIGURE 1 is a vertical, medial section of a valve constructed in accordance with the invention with certain parts being shown in elevation for added clarity; and FIGURE 2 is a fragmentary, sectional view taken along the line 2—2 of FIGURE 1.

Referring to the drawing, the valve of the invention may be seen to comprise a valve body 10 formed with a plurality of internal chambers and passages. The various parts of the valve are supported within or carried by the body 10.

The body 10 is formed with an elongated and vertically oriented chamber having an interconnected main section 12 and pressure-sensing section 14. A plurality of passages, including an inlet passage 16, an outlet passage 18, and a signal outlet passage 20, all communicate with the main section 12 and extend horizontally outwardly and open to the exterior of the body 10. Ports 16a, 18a, and 20a are formed in the wall of the chamber at the junction of these three passages with the main section 12. The inlet port 16a at the junction of the inlet passage 16 with the main section 12 is in illustrative case located approximately mid-way between the pressure-sensing section 14 and the lower end of the body 10. The outlet port 18a is located adjacent the inlet port 16a and spaced a short distance thereabove toward the pressure-sensing section 14. Spaced downwardly from the ports 16a and 18a approximately mid-way between them and the lower end of the body is the signal port 20a. In the illustrative embodiment the inlet port 16a is circumferentially spaced 180° from the outlet and signal ports 18a and 20a which are circumferentially aligned with one another. However, this angular arrangement may be varied without effecting the operation of the valve.

Slidably mounted in the upper portion of the main section 12 of the chamber is an elongated piston 22 arranged to function as valve means. The upper end of the piston 22 projects upwardly into the pressure-sensing section 14 and the lower end is disposed proximate the outlet port 18a. In this position, the lower end is arranged to cooperate with the wall of the main section 12 of the chamber to afford a variable orifice at the port 18a in the flow path between the inlet and outlet passages 16 and 18, respectively. It may be seen that as the piston 22 is moved longitudinally in the main section, the effective opening of the ports 18a, and, hence, the size of the orifice, varies. In the lowermost or limit position of the piston 22, illustrated in FIGURE 1, the size of the orifice is minimum and, as the piston moves upwardly toward the pressure-sensing section 14, the size of the orifice progressively increases.

For the purpose of establishing the limit position of the piston 22, a positioning element 24 is provided in the lower end of the main section 12 of the chamber. The upper end portion 26 of the element 24 is reduced in diameter in relation to the diameter of main section 12 and formed with an upwardly facing seat 28 that is engageable with the lower end of the piston 22. The end portion 26 is arranged co-axial with the chamber and by virtue of being reduced in size, it is radially spaced from wall of the main section 12. A flow path is thus established through the main section 12 between the inlet port 16a and outlet port 18a, and the inlet and outlet passages 16 and 18 are in constant communication with one another irrespective of the position of the piston 22.

In order to supply a pressure signal or permit secondary flow to take place intermittently from the inlet passage 16 to the signal passage 20, an auxiliary signal passage 29 is provided through the positioning element 24. This last-mentioned passage comprises an axial bore 30 in the element 24 opening at the seat 28 and extending downwardly and opening into a transverse bore 32 (FIGURE 2). The bore 32 in turn joins a circumferential groove 34 aligned with the signal port 20a in the main section 12 of the chamber. As may be seen in FIGURE 1, the groove 34 is of substantial width in order to remain in communication with the port 20a upon longitudinal adjustment of the positioning element 24.

It may be seen in FIGURE 1 that when the piston 22 is in its lower limit position resting on the seat 28, the opening to the auxiliary signal passage 29 in the element 24 is blocked. Therefore, in this condition, only primary flow takes place, such flow being through the inlet passage 16 and the main section 12 of the chamber, across the orifice at the port 18a and finally out through the outlet passage 18. In order to insure effective blocking of the signal passages 29–20, a sealing plug 36 is press-fit in a recess 37 in the seat-engaging surface on the lower end of the piston 22. Preferably, the plug 36 is formed of a resilient, deformable sealing material, such as rubber.

On the other hand, when the piston is moved from its limit position of FIGURE 1, primary flow continues and a pressure signal is supplied. This results from the fact that opening to the auxiliary signal passage 29 is no longer blocked. Thus, flow takes place through the signal passages 29–20 to supply to desired signal.

Longitudinal adjustment of the positioning element 24 to vary the limit position of the piston 22 is made possible by providing the element with a threaded end portion 38 which is received in the correspondingly threaded lower end portion 40 of the main section 12 of the chamber. Rotation of the element 24 to vary its longitudinal position is facilitated by a knurled adjustment knob 42 on the lower end of the element. Preferably, in order to prevent leakage, the element 24 embodies a pair of circumfential grooves 44 and associated O-rings 46 located, one each, on opposite sides of the groove 34. Following such longitudinal adjustment, the piston 22 remains seated, assuming no primary flow is taking place. The minimum size of the variable orifice at the port 18a has been increased or decreased, depending upon whether the element was advanced or retracted in the main section 12.

Operational movement of the piston 22 from its limit position to supply a pressure signal and to increase the size of the variable orifice is achieved by means of a resilient, flexible diaphragm 48 connected to the piston. The diaphragm 48 extends transversely across the pressure-sensing section 14, separating it into an upstream compartment located adjacent the main section 14 of the chamber and a downstream compartment adjacent the upper or terminal end of the chamber. These compartments 14a and 14b are, in turn, connected to the inlet and outlet passages 16 and 18 by the connecting passages 50 and 52, respectively, in the body 10.

Accordingly, the lower or upstream side of the diaphragm 48 senses pressure on the inlet side of the orifice at the port 18a, while the upper or downstream side of the diaphragm senses pressure on the downstream side of the orifice. It is to be noted that the effective area on the upstream side of the diaphragm 48 (including the exposed area of the lower end of the piston 22) is initially slightly smaller than the effective area on the downstream side. This follows from the fact that the valve seat 28 initially covers a portion of the lower end piston 22, thereby reducing the effective area on the upstream side in this amount. On the other hand, when the piston 22 has moved upwardly from its limit position, its entire lower end is exposed, and therefore the effective areas on the two sides of the diaphragm 48 are then equal. As will be brought out more fully below, this is advantageous from the standpoint of insuring positive opening of the valve to supply a pressure signal.

In most known applications, it is desired that the threshold flow at which the valve operates to supply a pressure signal be relatively low in relation to its primary flow capacity. Also, it is desired that the pressure signal be terminated at a primary flow which is substantially equal to the threshold flow. Therefore, as in the illustrative case, the effective area on the upstream or lower side of the diaphragm when the piston 22 is seated, is made large in relation to the area of the piston initially covered by the seat 28. When this relationship exists, the difference in effective areas on the two sides of the diaphragm 48 does not materially affect opening or closing of the valve at low primary flow rates. However, as long as there is some small difference in effective areas when the piston is seated, the positive opening feature still obtains.

The piston 22 is normally urged to its limit position of FIGURE 1. Gravity and the resiliency of the diaphragm 48 may be used to so urge the piston. Preferably, however, a relatively light compression spring 49 is also provided for this purpose.

For convenience of manufacture, the valve body 10 is formed in two parts with the interface being in a horizontal plane extending transversely through the pressure-sensing section 14 of the chamber. This facilitates, in particular, the formation of the chamber, and, in addition, is advantageous from the standpoint of mounting of the diaphragm 48. Marginal edges of the diaphragm 48 are then simply interposed between the mating surfaces of the two parts of the body which, in turn, are secured together by any siutable means, as by screws 54. The diaphragm 48 thereby serves as a gasket to enhance sealing. Apertures are provided in the marginal edge of the diaphragm at the location of the passage 52 and at the screws 54. Connection of the diaphragm 48 to the upper end of the piston 22 may be conveniently accomplished by means of an assembly including a screw 56, a pair of flat support washers 58 disposed on opposite sides of the diaphragm, and a sealing washer 60.

To connect the valve for use, the inlet and outlet passages 16 and 18 are connected in a primary flow line of pressurized fluid comprising either gas or liquid. The signal passage 20 is connected to an element or device arranged to receive a pressure signal or secondary flow when the primary flow exceeds a predetermined threshold level. In the drawing, the body is formed with threaded, counter-sunk bores at the openings to the passages 16, 18 and 20 for receiving threaded conduits 16b, 18b and 20b.

It is apparent that the valve of the invention may be used to advantage in a variety of ways. As suggested above, it may be used in an intermittent flow system to supply a signal when the primary flow exceeds an adjusted, threshold level and terminate the signal when the primary flow subsequently drops just slightly below that level. In another application, the valve could be installed in a constant flow system with a pressure being continually supplied. Should flow in such a system inadvertently fall below an adjusted minimum level, the pressure signal would be terminated to provide an indication.

In the event the valve were used in a respiration system, the inlet and outlet conduits would be connected in a primary flow path including, in series, a source of pressurized gas, pressure regulation apparatus, valve means and a suitable face mask, for administering the gas to a patient. The signal conduit 20b might be connected to a nebulizer which, in turn, was connected to the mask. In such a respiration system, the nebulizer operation would be initiated during each inspiration phase of breathing when primary flow to the patient exceeded the adjusted, threshold level. Such operation would terminate when the primary flow dropped below a level just slightly less than the threshold level.

With the piston 22 in its normal limit position in FIGURE 1, primary flow initially takes place from the inlet passage 16 to the outlet passage 18 through the previously described flow path, including the orifice at the port 18a. Pressure on the upstream side of the orifice is then sensed by the upstream or lower side of the diaphragm 48, while pressure on the downstream side of the orifice is sensed by the downstream or upper side of the diaphragm. As is known in the art, the pressure differential across an orifice of given size varies in accordance with the rate of flow. Increases in the rate of flow bring about a corresponding increase in the pressure differential. Conversely, for a given rate of flow, as the size of the orifice increases, the pressure differential thereacross proportionately decreases.

Assuming the valve is used in an intermitted flow system, such as a respiration system, with no primary flow taking place, no pressure signal is supplied.

When a low primary flow rate is initiated, a correspondingly low pressure differential is produced. The pressure differential is assumed to be insufficient to overcome the combined effects of the force of the spring 49, resilience of the diaphragm 48, gravity acting on the piston 22, and the difference in effective areas on the upstream and downstream sides of the diaphragm, all acting to maintain the piston 22 in its limit position. Accordingly, the piston remains in its limit position with no pressure signal being supplied as long as this condition exists.

Once the flow rate increases to the threshold level, the pressure differential across the orifice at the port 18a is sufficient to overcome the combined effects of the forces maintaining the piston 22 in its limit position. The diaphragm 48 moves upwardly and cracks the piston off its seat 28. As this takes place, the additional area on the lower end of the piston 22 is exposed to fluid pressure on the upstream side of the orifice, thereby increasing the effective area on the upstream side of the diaphragm 48. Therefore, positive opening of the valve takes place to supply a pressure signal or secondary flow through the path comprising the inlet passage 16, the main section 12 of the chamber, the auxiliary signal passage 29, and the signal passage 20. During such operation primary flow continues.

An important feature of the present valve is that as primary flow increases and the pressure differential increases, the diaphragm responds to move the piston 22 farther away from its seat 28. The effect of this is that the orifice increases in size and the obstruction or restriction to fluid flow imposed by the orifice is greatly reduced as compared to a situation in which the orifice were fixed in size. As is apparent, the pressure differential does not increase at a rate proportional to increase in the rate of primary flow. As a consequence, it will be appreciated that the threshold flow may be extremely low, yet the maximum capacity of the valve, high.

Should the primary flow subsequently decrease, the pressure differential across the orifice at the port 18a decreases, and the diaphragm 48 under the influence of the spring 49 and other forces discussed above, causes the piston 22 to move back toward its limit position. After the primary flow rate has dropped below the threshold level, the piston 22 moves back against its seat 28 to block the opening to the auxiliary signal passage 29. In this connection, it is important to note that once the valve is open, the effective areas on the two sides of the diaphragm 48 are equal. Therefore, the primary flow at which the piston 22 moves back to its limit position to close the valve is slightly less than the threshold flow at which it moves out of such position to effect opening.

Should it be desired to vary the threshold flow, it is simply necessary to adjust the longitudinal position of the element 24. As the element 24 is advanced or moved further up into the main section 12 of the chamber body, the minimum size of the orifice at the port 18a is increased and, hence, the threshold flow is also increased. On the other hand, as the element is moved out of the body to lower the piston 22, the orifice size is decreased, and the threshold flow is reduced.

Although one embodiment of the invention has been illustrated and described with a certain degree of particularity, it will be understood that this is only by way of illustration and that various changes in the construction and arrangement of the various parts may be made without departing from the spirit and scope of the invention. In particular, it is noted that the relative sizes of the parts, including their ports, passages and chambers, may be varied to meet the particular operational requirements of a given application.

What is claimed is:
1. A valve comprising:
a valve body;
means on said body forming inlet, outlet and signal passages;
means on said body forming a primary flow path between said inlet and outlet passages;
means on said body forming a secondary flow path between said inlet and signal passages;
valve means mounted on said body for movement toward and away from a limit position and cooperable therewith to provide a variable orifice in said primary flow path, the size of said orifice varying in accordance with movement of said valve means;
means on said body and associated with said valve means for blocking flow through said secondary flow path when said valve means is in its limit position;
means on said body for urging said valve means to its limit position; and
means on said body responsive to a pressure differential across said orifice for moving said valve means away from its limit position to permit flow through said secondary flow path and to vary the size of said orifice.
2. A valve comprising:
a valve body;
means on said body forming inlet, outlet and signal passages;
means on said body forming a primary flow path between said inlet and outlet passages;
means on said body forming a secondary flow path between said inlet and signal passages;
valve means mounted on said body for movement toward and away from a limit position and cooperable with said body to provide a variable orifice in said primary flow path, the size of said orifice varying in accordance with movement of said valve means and being minimum when said valve means is in its limit position;
means on said body and associated with said valve means for blocking flow through said secondary flow path only when said valve means is in its limit position;
means on said body for yieldably urging said valve means toward its limit position; and
means on said body responsive to a pressure differential across said orifice for moving said valve means away from its limit position.
3. The subject matter of claim 2 including means on said body associated with said valve means for adjustably establishing the limit position thereof.
4. A valve comprising:
a valve body having a chamber with a main section and a pressure-sensing section;
means on said body forming inlet, outlet and signal passages all communicating with said main section, said inlet and outlet passages being in constant communication with one another in a flow path through said main section and said signal passage communicating with said inlet passage through said main section;
valve means movably mounted in said main section and cooperable with the wall thereof to provide a variable orifice in the flow path between said inlet and outlet passages, said valve means being normally positioned whereby said orifice is of minimum size; means on said valve means blocking flow through said signal passage when said valve means is in its normal position;

means in said pressure-sensing section operatively connected to said valve means and responsive to a predetermined pressure differential across said orifice for moving said valve means from its normal position to increase the size thereof and to unblock said signal passage to permit flow therethrough.

5. A valve comprising:

a valve body having a chamber with a main section and a pressure-sensing section;

means on said body forming inlet, outlet and signal passages all communicating with said main section, said inlet and outlet passages being in constant communication with one another in a flow path through said main section and said signal passages communicating with said inlet passage through said main section;

valve means movably mounted in said main section to separate said main section from said pressure-sensing section and cooperable with the wall of said main section to provide a variable orifice in the flow path between said inlet and outlet passages;

positioning means in said main section and operatively associated with said valve means for establishing a limit position of said valve means, said variable orifice being of minimum size when said valve means is in its limit position;

means yieldably urging said valve means to its limit position;

means on said valve means blocking flow through said signal passage when said valve means is in its limit position; and means in said pressure-sensing section operatively connected to said valve means and responsive to a predetermined pressure differential across said variable orifice for moving said valve means out of said limit position to increase the size thereof.

6. The subject matter of claim 5 wherein the pressure differential across said orifice required to maintain said valve means out of its limit position is less than said predetermined pressure differential.

7. A valve comprising:

a valve body having an elongated chamber including a main section opening at one of its ends to the exterior of said body and an enlarged pressure-sensing section at the opposite end of said main section;

means on said body forming inlet, outlet and signal passages all communicating with said main section, there being a flow path established through said main section between the inlet port at the junction of said inlet passage with said main section and the outlet port at the junction of said outlet passage with said main section;

a positioning element disposed in the open end of said main section and adjustable longitudinally thereof, said positioning element having a valve seat positioned in said flow path and having an auxiliary signal passage opening at said seat and in constant communication with the signal port at the junction of said signal passage with said main section;

a piston slidably mounted in said main section with one end thereof proximate said seat and cooperable with the wall of said main section to afford a variable orifice in said flow path and with the opposite end thereof projecting into said pressure-sensing section, said piston being longitudinally movable from a limit position in sealing engagement with said seat wherein said orifice is of minimum size, away from said seat out of such sealing relationship to permit flow through said signal passages and to increase the size of said orifice;

a diaphragm extending transversely across said pressure sensing section separating it into an upstream compartment adjacent said main section and a downstream compartment adjacent the terminal end of said pressure-sensing section;

means on said body forming a passage between said inlet passage and said upstream compartment;

means on said body forming a passage between said outlet passage and said downstream compartment;

and spring means yieldably urging said piston toward its limit position.

8. The subject matter of claim 7 including means on said positioning means and accessible exteriorily of said body for so adjusting said positioning means.

9. A valve comprising:

a valve body having an elongated chamber with an interconnected main section and pressure-sensing section, the cross sectional area of said pressure-sensing section being greater than that of said main section;

means on said body forming inlet, outlet and signal passages all communicating with said main section, the outlet port at the junction of said outlet passage with said main section being longitudinally spaced from the inlet port at the junction of said inlet passage with said main section toward said pressure-sensing section, said inlet and outlet passages being in constant communication with one another through said main section;

a positioning element disposed in said main section adjacent said outlet port, said element presenting a valve seat facing toward said pressure-sensing section and having an auxiliary signal passage in constant communication with said signal passage and opening into said main section at said seat;

a piston slidably mounted in said main section and cooperable with the wall of said chamber to form a variable orifice at said outlet port, said piston being movable from a limit position in engagement with said seat to block flow through said signal passages, away from said seat to permit such flow and vary the size of said orifice;

a diaphragm extending transversely across said pressure-sensing section and separating it into upstream compartment adjacent said main section and a downstream compartment opposite thereto, said diaphragm being connected to said piston and movable therewith;

means on said body forming a passage between said inlet passage and said upstream compartment;

means on said body forming a passage between said outlet passage and said downstream compartment; and means biasing said piston toward its limit position.

10. A valve comprising:

a valve body having a chamber with a main section and a pressure-sensing section, the cross sectional area of said pressure-sensing section being greater than that of said main section;

means on said body forming inlet, outlet and signal passages all communicating with said main section, said inlet and outlet passages being in constant communication with one another in a flow path through said main section and said signal passage communicating with said inlet passage through said main section;

a piston slidably mounted in said main section to separate said main section from said pressure-sensing section and having one of its ends cooperable with the wall of said main section to provide a variable orifice in the flow path between said inlet and outlet passages, the fluid pressure in said inlet passage acting on said one end of said piston;

positioning means in said main section having a seat engageable with said one end of said piston to establish a limit position thereof, said variable orifice being of minimum size when said valve means is engaged with said seat in its limit position;

means yieldably urging said valve means toward its limit position;

sealing means on said valve means blocking flow through said signal passage when said valve means is in its limit position; and a diaphragm extending transversely across said pressure-sensing section and separating it into an upstream compartment for sensing pressure on the upstream side of said orifice and a downstream compartment for sensing pressure on the downstream side of said orifice, said diaphragm being connected to said piston and movable therewith, the effective area of said diaphragm over which fluid pressure acts being substantially greater than the area of said seat.

No references cited.

WILLIAM F. O'DEA, *Primary Examiner.*

D. J. ZOBKIW, *Assistant Examiner.*